United States Patent

Logis et al.

[15] 3,636,427
[45] Jan. 18, 1972

[54] SECTOR-SCANNING SERVOMOTOR CONTROL CIRCUIT

[72] Inventors: John Logis, Glen Burnie; Ronald C. Scheerer, Baltimore, both of Md.

[73] Assignee: The United States of America as represented by the Secretary of the Navy

[22] Filed: Aug. 5, 1970

[21] Appl. No.: 61,249

[52] U.S. Cl. .............................. 318/627, 318/282, 318/369
[51] Int. Cl. ............................................................. G05g 5/00
[58] Field of Search ........................... 318/626, 627, 282, 369

[56] References Cited

UNITED STATES PATENTS 3,197,684   7/1965   Riege ......................................... 318/626

Primary Examiner—T. E. Lynch
Attorney—R. S. Sciascia and H. H. Losche

[57] ABSTRACT

A fast stop-and-reverse two-phase motor control circuit having a solid-state timing network or a motor speed sensing network coupled to solid-state switches in relay circuits to produce a timed reverse torque on the motor proportional to torque time or motor speed to stop the motor and hold it against a limit stop with low-power torque without exceeding limit stop mechanical strength.

5 Claims, 4 Drawing Figures

INVENTORS
*JOHN LOGIS*
*RONALD C. SCHEERER*

BY *H. H. Losche*
ATTORNEY 3,636,427

SECTOR-SCANNING SERVOMOTOR CONTROL CIRCUIT

BACKGROUND OF THE INVENTION

Two-phase electric drive motors with connected reference generators are usually used in radar equipment to drive such devices as antennas in an oscillating or scanning manner against limit stops, and as this oscillation is increased in speed to speed up antenna movement to cope with the speedup of target objects problems arise as to the stopping moments of these motors to prevent destruction of the limit stops.

In such motor control circuits two principal problems became apparent. (1) The amount of time required to stop the motor and position it against the stop was too long for the prior motor systems. And (2) the damage to the mechanical stop resulting from erratic triggering of the control circuit by transients on the power leads was to frequent. The solution of these problems brought about the embodiments of this invention which was tantamount to a speedup of the oscillatory movement of such devices as radar antennas and the like.

SUMMARY OF THE INVENTION

In the present invention two embodiments are shown and described. In the more preferred embodiment, a bridge rectifier and a filter utilize the reference generator output, a part of the motor drive system, to provide an analog voltage proportional to motor speed for use in a comparator and a silicon controlled rectifier (SCR) circuit controlling relays to stop and reverse a motor and bring it to a mechanical limit stop in a most efficient manner in the shortest possible time. In the other preferred embodiment, a unijunction transistor and two SCR circuits including RC timing circuits are used to control the coordination of energization and deenergization of a plurality of relays in the motor control forward and reverse torque circuits to time partial reverse torque energizations of the motor to bring it to its mechanical stops without exceeding mechanical limits. It is therefore an object of this invention to provide timing and speed sensing circuits for a motor lobing system for driving devices in an oscillatory manner to mechanical limits for electrodynamically braking the motor prior to engagement of a limit stop rapidly without mechanical distortion thereof.

BRIEF DESCRIPTION OF THE DRAWINGS

These and other objects and the attendant advantages, features and uses of the invention will become more apparent to those skilled in the art as more detailed description proceeds when considered along with the accompanying drawing in which.

DESCRIPTION OF THE PREFERRED EMBODIMENT

Figure 1:
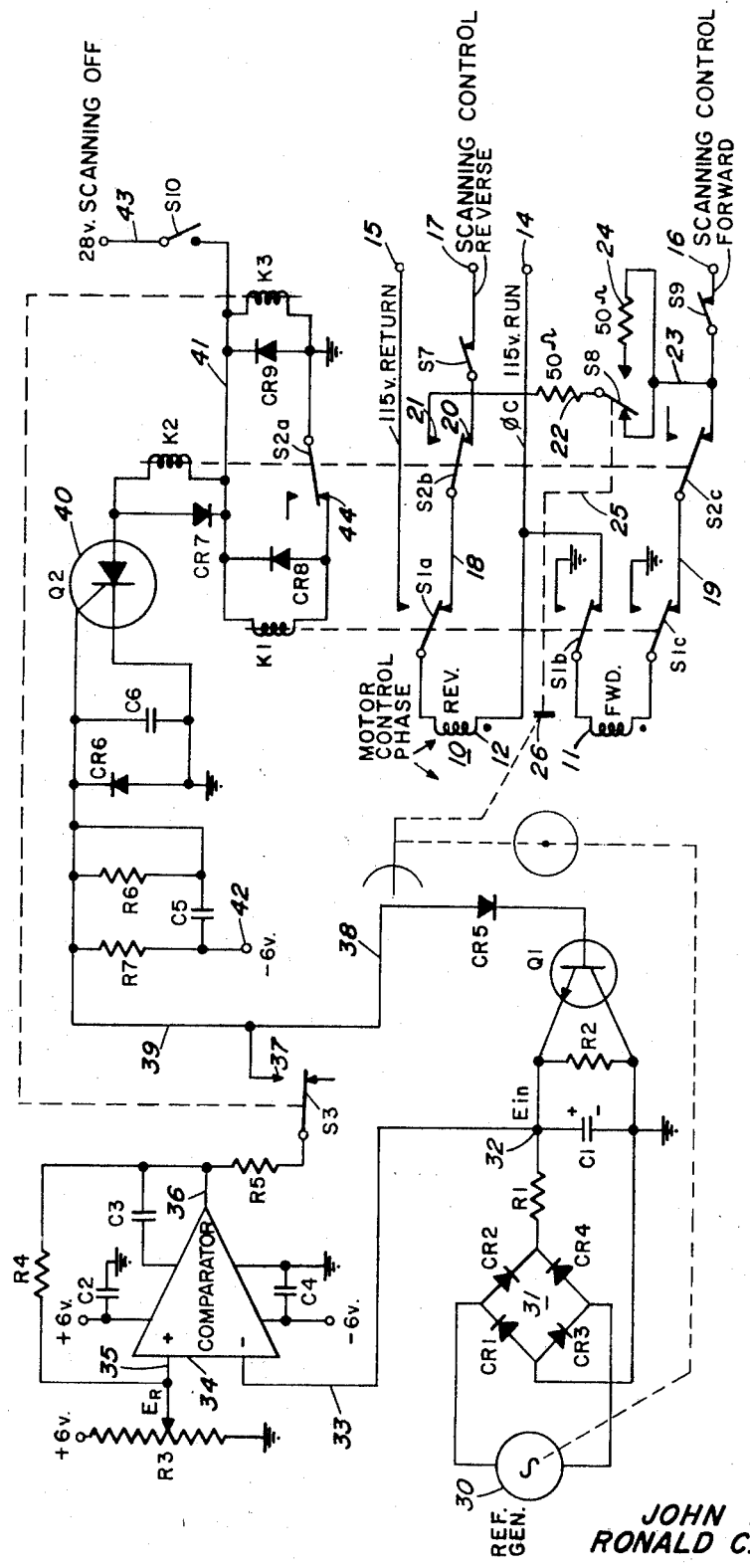
FIG. 1 is a circuit schematic drawing partially in block of a preferred embodiment of the invention.

Referring more particularly to FIG. 1 a two-phase motor (not completely shown herein) has a motor control phase 10 shown herein as having a forward winding 11 and a reverse winding 12. The forward and reverse windings 11 and 12 are coupled to a voltage supply at terminal 14, herein shown to be φC115 volts running voltage with a 115-volt return at terminal 15. Terminal 16 supplies a scanning control forward voltage while terminal 17 provides a scanning control reverse voltage. The forward and reverse windings 11 and 12 are controlled in these voltages from 14, 15, 16, and 17 through a relay switch K1 mechanically throwing the switches S1a, S1b, and S1c. The switch blade of S1a is coupled to the reverse winding to switch between a contact from the return terminal 15 and a contact to conductor 18. Switch blade S1b switches between a contact in circuit with the input terminal 14 and a grounded contact. Switch blade S1c of the forward phase winding 11 is switchable between one contact connected to a conductor 19 and to a second contact which is grounded. A second relay switch K2 actuates switches S2a, S2b, and S2c. The switch S2a will soon be described. Switch S2b has the switch blade coupled to the conductor 18 and is adapted to be switched between one contact 20 coupled through a scanning switch S7 to terminal 17. An alternate contact 21 is coupled through a resistor 22 to switch S8 having alternate contacts, the normally closed contact being coupled through a conductor 23 to the scanning control forward terminal 16 by way of the scanning switch S9. The alternate contact of switch S8 is coupled through a resistor 24 through the conductor 23 to the terminal 16 through scanning switch S9. The resistors 22 and 24 are herein shown to be of the value of 50 ohms although other resistance values may be used, where desired, as will be made clear in the description to follow. The switch S8 may be actuated by an external source but is shown herein for the purpose of an example of operation as having an actuator 25 ending with a head or switch actuating mechanism 26 engageable at the reverse limit stop of the two-phase motor, only the control phase 10 being shown herein. In the normally closed switch positions shown herein in FIG. 1 the two-phase motor controlled by the forward and reverse windings 11 and 12 will be scanned in the forward and reverse directions in accordance with the alternating actuations of switches S7 and S9, as well understood by those skilled in the art in the control of a two-phase scanning motor where it may be used for example in the forward and reverse scanning operation of a radar antenna, and the like. This is accomplished by the running voltage from terminal 14 being applied through the forward winding 11 through switch S1c and switch S2c to the terminal 16 through the scanning switch S9. And in like manner terminal 14 is coupled through the reverse winding 12, switch S1a, and switch S2b through the scanning control switch S7 to the reverse lobing control terminal 17.

The operation of the relay switches K1 and K2 together with the operation of a relay switch K3 is provided by a motor control circuit now to be described. In the two-phase motor control scanning circuits operating as part of the system is an alternating current reference generator 30 which generator exists as part of the two-phase motor assembly. This reference generator alternating current (AC) output is directly proportional to the speed of the two-phase motor. The output of this generator is fed to a full wave bridge rectifier circuit 31 having crystal rectifiers CR1 through CR4 therein. The output of the bridge rectifier is filtered by the resistance-capacitance network R1, C1, R2, to provide the voltage Ein at the terminal point 32. This terminal point 32 is coupled to the emitter of transistor Q1, the collector of which is coupled to ground in parallel across the resistor R2 and capacitor C1.

The Ein voltage at terminal 32 is coupled also through a conductor 33 to the inverting input of a comparator 34. A second input 35 to the comparator 34 is from the adjustable tap of a potentiometer R3 having the resistance element thereof coupled across a 6-volt source. The output 36 of the comparator 34 is coupled in feedback through a resistor R4 to the input 35. The comparator 34 is appropriately coupled in a voltage supply circuit from +6 volts to −6 volts, for example, with appropriate filtering capacitor C2 and C4. The feedback is also filtered by capacitor C3 in comparator 34. The output 36 is coupled through a resistor R5 to the switch blade S3 of the relay switch K3. Switch S3 normally lies on a dead pole, but upon energization of the relay K3 switch blade S3 will contact 37 having one branch conductor 38 coupled through a diode CR5 to the base of transistor Q1.

Contact 37 is coupled also by the branch conductor 39 through a resistor-capacitor-diode network R6, R7, C5, CR6, and C6 to the gating terminal 40 of a silicon controlled rectifier Q2. The cathode of Q2 is directly coupled to ground and the anode of Q2 is coupled through the relay energizing coil K2 to a conductor 41. The resistance-capacitance network circuit R6, R7, C5, CR6, and C6 are biased from a terminal 42 to a negative voltage source, herein illustrated by example as being −6 volts. This terminal 42 is coupled to the junction of resistor R7 and capacitor C5. The conductor 41 is coupled to the contact of a switch S10 having a switch blade thereof coupled to the terminal 43 supplying a "scanning off" voltage, herein shown to be 28 volts for the purpose of example. Switch S10 is normally open and conductor 41 is coupled to one lead of the energizing coil of the relay K1, the opposite lead of which is coupled to a contact 44 of switch S2a actuated by the relay K2, the alternate contact being a dead pole. The switch blade of switch S2a is coupled directly to ground. The energizing coil of the relay switch K3 is coupled between the conductor 41 and the ground point. The three relay energization coils K1, K2, and K3 have the crystal diodes CR8, CR7, and CR9, respectively, coupled in parallel therewith to take care of back EMFs upon deenergization, as is well understood by those skilled in the art.

OPERATION OF FIGURE 1

Figure 3:
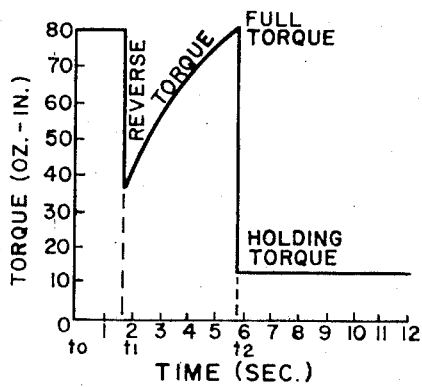
FIG. 3 is a time and torque curve produced by the circuit of FIG. 1.

In the operation of the embodiment shown in FIG. 1 with reference to FIG. 3, let it be assumed that switch S10 is open and the relay switches K1, K2, and K3 are positioned on the contacts as shown in this figure. Under these circumstances the scanning in the forward and reverse directions will be produced by the motor in accordance with a motor control phase 10 through forward and reverse windings 11 and 12 by virtue of the circuit through the K1 and K2 relay switches to the forward scanning and reverse scanning terminals 16 and 17 in accordance with the operation of the lobing switches S7 and S9. When it is desired to cut off scanning of the motor and bring it to its limit stop in the reverse direction, switch S10 is closed. The closing of switch S10 immediately energizes relay K3 to close switch S3 with contact 37 and energizes relay K1 through the contact 44 and switch blade S2a since relay K2 remains unenergized. This immediately sets up a reverse torque at full voltage from terminal 14 through reverse winding 12 and switch S1a to the return terminal 15. As shown in FIG. 3 the ounce-inches of torque is fully applied, shown herein to be 80, for a time limit determined by the two-phase motor characteristics as indicated on the output of the reference generator 30. Since the reference generator 30 is directly coupled in the system with the two-phase motor as the speed of the two-phase motor increases the voltage output of the reference generator increases and as the speed of the two-phase motor decreases the voltage output of the reference generator decreases. Accordingly, as full reverse torque is applied to the two-phase motor its speed with be reduced and accordingly the direct current voltage output at the terminal 32, and designated Ein, will be reduced. When motor speed is high the inverting input 33 to the comparator will produce a positive voltage greater than from the input 35. As soon as the voltage Ein reduces to the positive input voltage at 35 established by the potentiometer R3, causing this positive voltage to go negatively with respect to 35, the comparator 34 output will go from negative to positive on the output 36. When this output on 36 becomes positive, this voltage will be applied through the diode CR5 to the base of transistor Q1 short-circuiting the Ein voltage and at the same time gating the SCR–Q2 into a conductive state. Once Q2 is placed in a conductive state it remains that way although Q1 shorts out the Ein voltage to the comparator 34. This protects the motor control circuit against spurious voltages retriggering Q2 to "off" and "on" conductive states. Conduction of Q2 energizes relay K2 to cut off the circuit through relay K1 and to raise all contacts of S2a, S2b, and S2c to their upper contact positions. While the forward winding 11 is connected back to the lower contacts, the forward scanning circuit is broken by the switch S2c resting on its upper dead pole. The circuit through the reverse winding 12 is now from terminal 14, through the winding 12, through switch S1a, conductor 18, and switch S2b to contact 21 through the resistor 22 to the scanning control terminal 16 to provide approximately a 36 ounce-inch torque, as shown in FIG. 3 of the drawing. By external circuitry means through the scanning terminal 16 the torque is ramped up to full torque at which time the motor should reach its reverse limit stop activated by actuator 26, 25 to throw switch S8 to its alternate contact to connect resistor 24 now establishing a circuit from terminal 14 through reverse winding 12, switch S1a, conductor 18, switch S2b, through resistors 22 and 24 to the scanning terminal 16 providing a holding torque of approximately 12 ounce-inches, as shown in FIG. 3. Accordingly, the amount of time from $t_0$ to $t_1$ in FIG. 3 that it takes for the two-phase motor speed to drop to an efficient point to remove the full reverse torque and ramp the reverse torque from 36 ounce-inches up to full torque to where the motor should arrive in the quickest time to its reverse limit stop, shown as time $t_2$ in FIG. 3, should bring this motor to a stop without damage to the limit stop and it will be held in this position by the holding torque of 12 ounce-inches. In this manner the scanning control two-phase motor is made to arrive at its reverse limit stop without damage and without false triggering of the SCR–Q2. It has been found that the speed of decelerating and stopping the motor against its reverse limit stop without damage has been decreased in time by 80 percent over other known similar devices. When it is desired to place the motor back into its scanning operation, switch S10 may be opened and the relay switches and other switches will again resume the positions shown in FIG. 1 for this scanning operation.

EMBODIMENT OF FIG. 2

Figure 2:
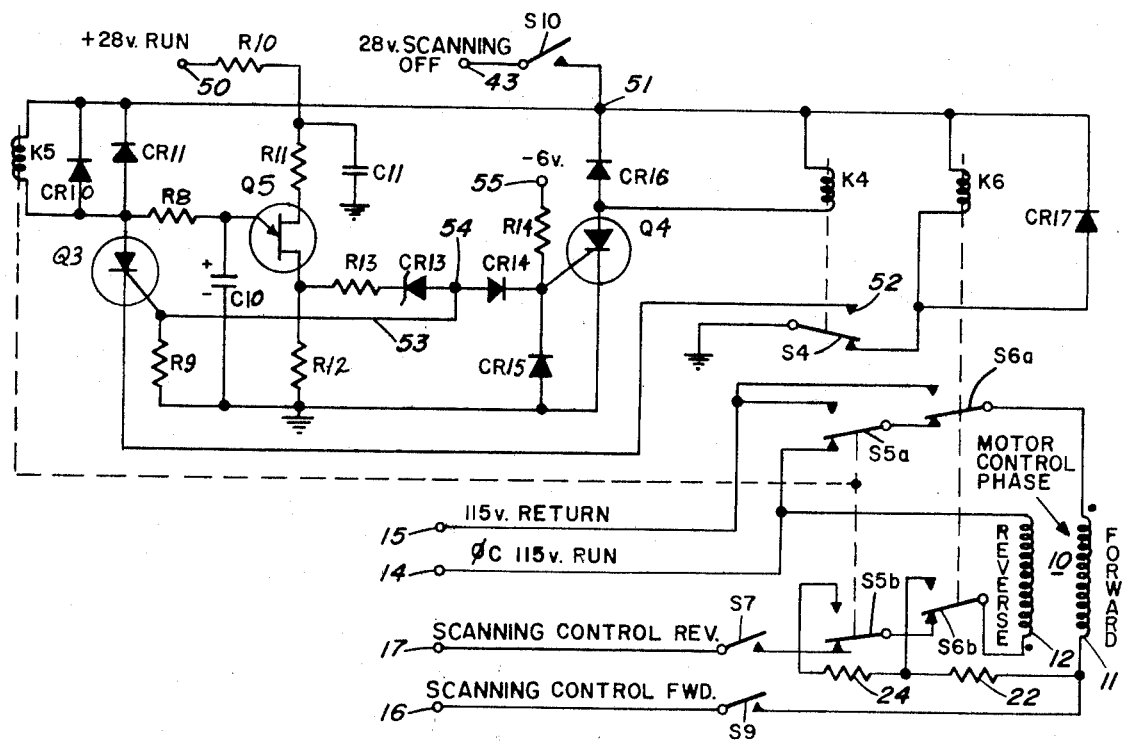
FIG. 2 is a circuit schematic drawing of a second embodiment of the invention.
Figure 4:
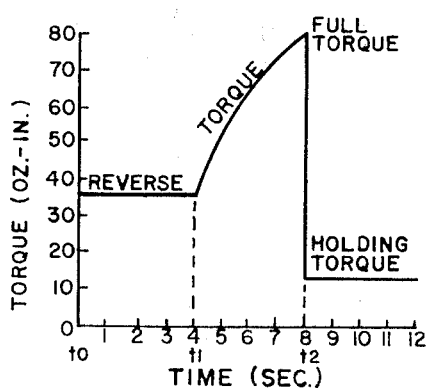
FIG. 4 is a time and torque curve produced by the circuit embodiment of FIG. 2.

Referring more particularly to FIG. 2 and its companion FIG. 4, the motor control two-phase windings 10 are shown as the forward winding 11 and the reverse winding 12 similar to that of FIG. 1. As in FIG. 1 the voltage supply for the motor comes from terminal 14 with return to terminal 15 with the scanning control forward voltage and the lobing control reverse voltage coming from terminals 16 and 17, respectively. Again the voltages are supplied to the forward and reverse windings through relays K4, K5, and K6 operating switches S4, S5a, and S5b, S6b, respectively. As shown in the unenergized condition in FIG. 2 the forward and reverse windings 11 and 12 will have scanning voltages applied thereto from terminal 14 through S5a and S6a through the forward winding 11 and the scanning switch S9 to the lobing control forward terminal 16, while the reverse winding 12 is from the terminal 14 through switch S6b, S5b and scanning switch S7 to the lobing control terminal 17.

In this embodiment the motor control circuit is through a timing circuit including two SCRs Q3 and Q4 and a unijunction transistor Q5. The unijunction transistor Q5 has a supply voltage from terminal 50 through resistors R10 and R11 to one base electrode, the other base electrode being through a resistor R12 to ground. The emitter gating electrode of Q5 is coupled through a resistor R8 to the anode of Q3, this anode being coupled through the energization coil of relay K5 to a terminal point 51. The 28-volt side of the resistor R8 being coupled to the anode of Q3 prevents further triggering of SCR–Q5 after SCR–Q3 has been fired eliminating false triggering. Two crystal rectifiers CR10 and CR11 are coupled in parallel across the relay coil K5. The gating electrode of Q5 is coupled to one plate of a storage capacitor C10, the opposite plate of which is coupled to ground. The cathode of Q3 is coupled to a contact 52 of the relay switch S4, this contact 52 being normally open. The gating terminal of Q3 is biased by resistor R9 from ground and is also coupled by a conductor 53 to a terminal point 54 being the anode of a Zener diode CR13 and the anode of a crystal rectifying diode CR14. The cathode of Cr13 is coupled through a resistor R13 to the lower base Q5 and the cathode of CR14 is coupled to the gating terminal of Q4. This gating terminal of Q4 is biased from a negative voltage source at terminal 55, through resistor R14, and through CR15 to ground. The junction of resistors R10 and R11 is coupled through a capacitor C11 to ground operating as a filter capacitor. The cathode of Q4 is coupled to ground and the anode thereof is coupled through the energization coil to relay K4 to terminal 51. A crystal rectifier CR16 is coupled in parallel with the coil of K4. In like manner with that of FIG. 1, a 28-volt "scanning off" supply voltage may be coupled to terminal 43 through the normally open switch S10 to terminal 51. A diode CR17 is coupled in parallel to an energization coil of relay K6 to dissipate back EMFs on deenergization on the coil as stated for FIG. 1.

OPERATION OF FIGURE 2

Let it be assumed as in FIG. 1 that without any "scanning off" voltage, as by closing of a switch S10, the forward and reverse scanning voltages are conducted through the forward and reverse windings 11 and 12 from terminal 14 through the scanning switches S9 and S7 to produce scanning operation of the two-phase motor. Upon closing switch S10 relay K6 will immediately be energized raising switch blades of S6a and S6b to their upper contacts. This cuts off circuit through forward winding 11 and sets up a reverse winding 12 energization through S6b and resistor 22 to the scanning control terminal 16, the resistance 22 providing approximately a 36 ounce-inch torque, as shown in FIG. 4. After the time required to charge capacitor C10 from the "scanning off" voltage at terminal 43 the unijunction transistor Q5 will conduct applying a gating voltage to both Q3 and Q4. Since the cathode circuit of Q3 is broken by switch S4, Q4 will go into conduction and energize relay K4. This period of time is shown as $t_o - t_1$, or 4 seconds in FIG. 4. The torque will then be ramped from the scanning terminal 16 induced in the external circuit to produce a reverse torque on the motor at which time capacitor C10 will again have been charged to a point of energizing Q5 and again applying a gating voltage to Q3 and Q4. Assuming Q4 is already in conduction, it will not be affected and since Q3 has a cathode circuit established through switch S4, it will be energized to energize relay K5 pulling switch S5a and S5b to their upper contact positions. This places both resistors 22 and 24 in the reverse winding circuit to produce the holding torque of approximately 12 ounce-inches, as shown in FIG. 4 after 8 seconds of time at time $t_2$. In this manner the scanning two-phase motor will be brought to a stop and returned to its reverse holding limit and held by a slight torque until the "scanning off" switch S10 is reopened to reestablish the scanning operation of the two-phase motor. In this modification the speed of the scanning motor and its characteristics are not taken into account and the motor is stopped and reversed to its reverse holding limit by a time established by the R8, C10 circuit as an optimum time for most scanning motors. This modification showed approximately a 43 percent improvement over prior known reverse stop motor systems of this type.

While modifications may be made and voltages used other than those shown herein, it is to be understood that we desire to be limited in the spirit of our invention only by the scope of the appended claims.

We claim:

1. A fast stop-and-reverse two-phase motor and reference generator control circuit comprising:
   forward and reverse electric motor windings for a two-phase power motor adapted to drive to a mechanical limit stop in the reverse rotative direction;
   a voltage source for driving said electric motor in scanning forward and reverse directions;
   relay switches, scanning switches, and switches with resistances in circuit therewith, in couplings between said voltage source and said forward and reverse electric motor windings, said relay switches having relay armatures, one relay switch having contacts to disconnect the forward motor winding from said voltage source and to connect said reverse winding to a first reverse torque condition in an energized condition, a second relay switch having contacts to break the circuit to said one relay switch and to establish a circuit through one of said resistances for a second reverse torque condition in the energized condition, and a third switch operable to switch in a third reversing torque by current through said resistors to hold said motor lightly against its reverse limit, and said scanning switches being operative to effect motor scanning in the forward and reverse directions in the unenergized condition of said relay switches;
   a scanning off voltage source; and
   a relay control circuit coupled to said scanning off voltage and coupled to said relay armatures to control switching thereof to cut off scanning energization in the forward and reversing torque in the reverse winding, in the forward and reverse direction of the motor windings, to establish a quick reversing torque in the reverse winding, and to establish a low holding torque in the reverse winding under the several switched conditions whereby a motor adapted to be controlled by the forward and reverse motor windings is rapidly brought to a stop and gently brought to and stopped against its reverse limit stop and held there by a light torque.

2. A fast stop-and-reverse two-phase motor and reference generator control circuit as set forth in claim 1 wherein
   said motor control circuit includes an output from said reference generator providing an analog voltage of motor speed to become operative after the application of said scanning off voltage energizing said first relay to apply voltage source reversing torque to said motor, to energize said second relay switch placing one resistance of said resistances in circuit with said voltage source to produce an intermediate reversing torque on said motor, and means responsive to said motor coming to its reverse limit stop to activate said third switch to apply a low reverse limit stop to activate said third switch to apply a low reversing torque on said motor.

3. A fast stop-and-reverse two-phase motor and reference generator control circuit as set forth in claim 2 wherein
   said output from said reference generator is rectified in a rectifier network and filtered in a filter in series to a comparator circuit where said analog voltage is compared with a preadjusted voltage which preadjusted voltage, when exceeded, impresses a voltage on a silicon-controlled rectifier having the anode and cathode in circuit with the relay coil of said second relay.

4. A fast stop-and-reverse two-phase motor and reference generator control circuit as set froth in claim 1 wherein
   said motor control circuit includes a resitance-capacitance timing circuit for timing the conduction of first and second solid-state switches, the first solid-state switch being in circuit with said second relay switch and said third switch being a relay switch in circuit with said second solid-state switch.

5. A fast stop-and-reverse two-phase motor and reference generator control circuit as set forth in claim 4 wherein
   said timing circuit for timing the conduction of said first and second solid-state switches includes a unijunction transistor having its control electrode coupled to said resistance-capacitance network and its base electrodes coupled to the gate electrodes of two silicon-controlled rectifiers constituting said solid-state switches.

* * * * *

UNITED STATES PATENT OFFICE
CERTIFICATE OF CORRECTION

Patent No. 3,636,427                        Dated   1-18-72

Inventor(s)  JOHN LOGIS and RONALD C. SCHEERER

It is certified that error appears in the above-identified patent and that said Letters Patent are hereby corrected as shown below:

UNDER RULE 322

Column 3, line 32

"of the lobing switches S7 and S9."

should read

"of the scanning switches S7 and S9."

Column 4, lines 41 and 42

"operating switches S4, S5a, and S5b, S6b, respectively."

should read

"operating switches S4, S5a, and S5b, S6a, and S6b, respectively."

Column 4, line 46

"to the lobing control forward"

should read

"to the scanning control forward"

Column 4, lines 48 and 49

"to the lobing control"

should read

"to the scanning control"

Patent 3,636,427, dated 1-18-72

Inventors JOHN LOGIS and RONALD C. SCHEERER (CONTINUED)
- 2 -

Column 6, lines 19 and 20

DELETE

"reversing torque in the reverse winding, in the forward and"

Column 6, lines 39 and 40

DELETE

"reverse limit stop to activate said third switch to apply a low"

Signed and sealed this 27th day of June 1972.

(SEAL)
Attest:

EDWARD M. FLETCHER, JR.
Attesting Officer

ROBERT GOTTSCHALK
Commissioner of Patents